United States Patent Office 2,900,259
Patented Aug. 18, 1959

2,900,259

PROCESS OF PACKAGING DRIED FRUIT

James E. Snyder and Ruby J. Swartz, Akron, Ohio, assignors to The Goodyear Tire & Rubber Company, Akron, Ohio, a corporation of Ohio No Drawing. Application November 29, 1956
Serial No. 624,980

2 Claims. (Cl. 99—171)

This invention relates to the preparation of food products for market and is particularly concerned with the treatment of fruits.

Since the advent of marketing many products in transparent packages, it has been very difficult to retain transparency of the packaging material when dried fruits are contained therein because such fruits exude a sugary composition or sirup in the form of tiny droplets which form on the surface of the fruit. This causes a dulling effect of the fruit. As the fruit comes in contact with the confining surfaces, some of the tiny droplets of sirup are transferred to the container walls, thus creating a clouded effect on the transparent portions of the container.

It is, therefore, an object of this invention to provide a means for packaging dried fruit in transparent packages in a manner which reduces or eliminates clouding of the container. It is another object of this invention to provide dried fruit with added luster. It is a further object of this invention to provide a food product having added customer appeal.

In the practice of this invention, a surface layer having a surface active agent therein is applied on the surface of each unit of dried fruit. It has been found that fruit so prepared has added luster and will not fog the packaging material when contact is made therewith.

It is believed that the tiny droplets of exuded sirup are transferred to the container surfaces as tiny droplets. These droplets may become dried to deposit solids. In this manner, light transfer through the transparent portion of the container is not uniform and cloudiness results.

When the fruit has been treated in accordance with this invention, it is believed that the surface tension of the exuded sirup is reduced to the point where a uniform film is formed on the surface of the fruit instead of the tiny droplets. This provides a product with added luster.

When the treated fruit is packaged in transparent containers, transparency is not destroyed. It is believed that the sirup which has exuded to the surface of the fruit is transferred to the container wall in the form of a thin layer rather than as tiny droplets. Because light can pass through this layer without substantial scattering, transparency is retained. In this manner, natural luster of the fruit is retained as well as clarity of the film.

Generally, in the practice of this invention the fruit is treated with a surface active agent in water. The fruit can be dipped in a vat containing a solution of the coating material, or a spray process can be used.

A solution comprising as little as 0.25% by weight of the surface-active agent is ordinarily effective. The upper limit of concentration is not critical. However, it has been found to be desirable to keep the amount of coating material below about 1.0% of the weight of the water in order to prevent the formation of surface scum on the cooking vessel when the fruit is later processed. Also, higher concentrations of the surface-active agents, while effecting glossy surface and anti-smearing characteristics, may cause the fruit to become sticky. It has been found that a time interval of a few seconds in an immersion process, or that a single spray treatment, is effective. The fruit is dried in any customary manner after the treatment and prior to packinging.

According to the invention, several types of surface-active agents may be used to treat the dried fruits. Many of the well-known surface-active agents can be used, such as the nonionic surface-active agents disclosed in Synthetic Detergents and Emulsifiers—up to date, 1955, by John W. McCutcheon, a pamphlet published by MacNair-Dorland Company, Inc., New York, N.Y. The preferred nonionic surface-active agents are generally selected from the group consisting of (1) polyethylene glycol thio ethers, (2) fatty acid amide esters, (3) fatty acid amide condensates, (4) fatty alkylol amide condensates, (5) glycerol fatty acid esters and (6) alkyl phenyl polyethylene glycol ethers.

Obviously, the selected surface-active agents must be non-toxic, tasteless and odorless.

In the practice of this invention, any of the well-known transparent packaging materials having water repellant (hydrophobic) surfaces in contact with the fruit can be used. For example, rubber hydrochloride, vinylvinylidine copolymers, polyethylene, the polyvinyl chlorides, coated cellophanes, the hydrophobic surfaced cellulose derivatives and polyester films can be used as the packing material. Also, the container can be any type of package. For example, it can be a flexible film, a rigid box with a window, a molded container or glass.

Any fruits which are customarily sold in a dried state can be treated according to the teachings of this invention. Prunes, raisins, apricots, peaches and figs are examples of such fruits which can be packaged in transparent wraps using the teachings of this invention.

Certain dried fruits such as prunes and raisins which have been derived from slick skin fruits takes on an attractive glossy appearance when treated according to the invention. This luster adds much to the commercial appeal when the fruit is marketed in bulk.

The practice of the invention is illustrated by the following examples, but not limited thereto, in which commercial grade rubber hydrochloride film was used as a representative packaging material. The results are all manifest immediately after packaging. The control results are recorded only in Example 1.

*Example 1*

Polyethylene glycol tertiary dodecyl thio ether having a molecular weight between 422 and 462, marketed as Nonic 260 by Sharples Chemicals, Inc., was added to water to give a solution containing 0.25% by weight of solids. The following dried fruits were immersed in the solution at room temperature for a few seconds and removed. The excess solution was shaken off, and the fruit was allowed to air dry. After tackiness had disappeared, the treated fruit was packaged in flexible rubber hydrochloride bags and sealed. The completed package of fruit was jostled and flexed to induce opacity. The samples were observed after this treatment and following storage. The results of these observations, including controls are as follows:

(1) Untreated prunes and raisins—fruit dull, wrappers clouded;
(2) Polyethylene glycol tertiary dodecyl thio ether dipped prunes and raisins—glossy fruit surface, wrappers clear;
(3) Hot water dipped prunes and raisins—fruit dull, wrappers blotched;
(4) Cold water dipped prunes and raisins—fruit dull, wrappers blotched;
(5) Polyethylene glycol tertiary dodecyl thio ether dipped dried apricots, dried peaches and dried black mission figs—wrappers clear;

(6) Untreated dried apricots, dried peaches and dried figs—wrappers clouded;

(7) Water treated dried apricots, dried peaches and dried figs—wrappers clouded.

*Example 2*

A fatty acid amide ester, marketed as Michelene DLD by M. Michel & Company, was added to water to give a solution containing about 0.25% by weight of solids. This solution was used as a dip solution for dried prunes and raisins as in Example 1. After being packaged and tested as illustrated in Example 1, the treated prunes and raisins had a glossy appearance, and the packaging films retained transparency.

*Example 3*

A fatty acid amide condensate, marketed as Sellogen 0–245 in the form of a 100% concentrate by Jacques Wolf & Company, was added to water to form a solution containing about 0.5% by weight of solids. This solution was used as a dip solution for dried prunes and raisins as in Example 1. The treated prunes and raisins retained excellent appearance, and the packaging films remained tarnsparent.

*Example 4*

A fatty alkylol amide condensate, marketed as Alrosol in the form of a 87% concentrate by Geigy Chemical Company, was dissolved in water to form a solution containing about 0.23% by weight of solids. Dried prunes and raisins were dipped in the solution as in Example 1. The treated prunes and raisins retained excellent glossy appearance, and the packaging films remained transparent.

*Example 5*

Glycerol mannitan laurate, marketed as NNO in the form of a 100% concentrate by Atlas Powder Company, was added to water to form a solution containing about 0.25% by weight of solids. This solution was used to treat dried prunes and raisins as in Example 1. The treated fruit displayed a glossy surface, and the packaging films remained transparent.

*Example 6*

An alkyl phenyl polyethylene glycol ether, marketed as Tergitol NP–35 by Carbide & Carbon Chemicals Company, was dissolved in water to form a solution containing about 0.25% by weight of solids. This solution was used to treat dried prunes and raisins as in Example 1. The treated fruit displayed a glossy appearance, and the packaging films remained transparent.

Many other tests have been made which have shown uniformly desirable results.

While certain representative embodiments and details have been shown for the purpose of illustrating the invention, it will be apparent to those skilled in this art that various changes and modifications may be made therein without departing from the spirit or scope of the invention.

We claim:

1. In the process of preparing a package of dried fruit in a container having at least a portion made from a transparent film through which the contained fruit may be viewed, the improvement which comprises first applying to said fruit a thin coating of a nonionic surface-active agent selected from the group consisting of (1) polyethylene glycol thio ethers, (2) fatty acid amide esters, (3) fatty acid amide condensates, (4) fatty alkylol amide condensates, (5) glycerol fatty acid esters and (6) alkyl phenyl polyethylene glycol ethers, by immersing the fruit in an aqueous solution containing at least about 0.25% by weight of said surface-active agent, removing the fruit from the solution, draining excess solution from the fruit drying the fruit, placing the coated fruit in a container and closing the container to create a complete package in which clouding of said transparent film portion of the package by contact with the contained dried fruit is avoided.

2. A package of dried fruit comprising a container having at least a portion made from a transparent film through which the contained fruit may be viewed and enclosed within said container, dried fruit having on the surface thereof a thin coating of a nonionic surface-active agent selected from the group consisting of (1) polyethylene glycol thio ethers, (2) fatty acid amide esters, (3) fatty acid amide condensates, (4) fatty alkylol amide condensates, (5) glycerol fatty acid esters and (6) alkyl phenyl polyethylene glycol ethers, said coating being of such quantity as to substantially avoid clouding of said transparent film portion of the package by contact with the contained dried fruit.

References Cited in the file of this patent

UNITED STATES PATENTS

| | | |
|---|---|---|
| 1,510,679 | Katzprowsky | Oct. 7, 1924 |
| 1,683,068 | Forrest | Sept. 4, 1928 |
| 1,853,151 | Segur et al. | Apr. 12, 1932 |
| 1,853,152 | Segur et al. | Apr. 12, 1932 |
| 2,005,184 | Forrest | June 18, 1935 |
| 2,744,019 | Snyder et al. | May 1, 1956 |